United States Patent Office 3,495,980

Patented Feb. 17, 1970

3,495,980

PHOTOGRAPHIC PROCESSING METHOD

Seymour L. Hersh, Freehold, N.J., assignor to the United States of America as represented by the Secretary of the Army No Drawing. Filed May 13, 1966, Ser. No. 551,186
Int. Cl. G03c 5/06
U.S. Cl. 96—44 4 Claims

ABSTRACT OF THE DISCLOSURE

A simple photographic method of dodging is provided by projection pointing a negative onto a sheet of photographic paper, previously wetted with a particular developer. As the paper is exposed and developed simultaneously, metallic silver, formed in the exposed areas leaves a masking effect on the subsequently continuing exposure. Thus as the picture continues to develop, the impinging light flux is modulated by a continuously increasing positive mask.

This invention relates to a method of accurately reproducing all of the desired information contained in an original negative onto a sheet of photographic paper.

Modern negative materials are capable of recording practically all of the details in the original scene. Unfortunately, the limits of recording and reproduction on paper prints are especially restricted in that the inherent characteristic of reflection prints prevent the reproduction of the entire range of densities usually recorded on negatives.

Heretofore, "dodging," or local printing control involving shading and spot printing to compensate for negative tones that cannot be reproduced in a print, has been recognized as an effective means of compressing the effective printing range of the negative to match that of the paper thereby preserving information in the reproduction.

One such dodging method involves the use of phosphor quench printers. According to that method, a fluorescent screen is illuminated with ultra violet light. An infra red source illuminating the negative selectively quenches or extinguishes the fluorescence of the phosphor in an inverse proportion to the density of the negative. The method however, is slow and cannot provide a rapid means of producing dodged prints. It cannot be used for projection or "enlarged" photographs since the technique restricts it to contact printers. Moreover, the equipment is expensive, delicate, and bulky.

Another dodging method involves the use of electronic dodging printers. These devices use a cathode ray tube and a flying spot to expose the print. As the cathode ray tube beam illuminates the print, the amount of light transmitted through the negative is monitored by a photo electric cell which in turn provides control signals to a feedback circuit modulating the intensity of the cathode ray tube beam inversely with the density of the negative. In this manner, those portions of the print that require more exposure for correct reproduction are provided with light intensity determined to be sufficient. The size of the scanning spot in present equipment is limited to ⅜ inch. It is apparent that areas of detail smaller than ⅜ inch cannot be dodged. This is a disadvantage in the technique of electronic dodging. Furthermore, the equipment is expensive, bulky and delicate. Its mounting in mobile shelters must be compromised by the disadvantages of sensitive equipment of this nature. Moreover, maintenance and repair of this type of equipment requires highly trained technicians and specialized parts and supply.

A general object of this invention is to provide a simple method of reproducing a print from the original negative without the attendant loss of information and in a manner that overcomes the difficulties described in the use of the aforementioned dodging techniques. A more specific object of this invention is to provide a simple photographic method of dodging that will reproduce on the photographic print all of the fine detail contained in the highlight and shadow areas of the negative that would be lost using normal reproduction or dodging methods.

It has now been found that the above stated objectives can be attained by a simple chemical method when used in conjunction with a modified printing procedure.

The developing formula used in the method is:

Developing formula

| Ingredient: | Amount |
|---|---|
| Water | 750 cc. |
| Sodium sulfite (dessicated) | 90.0 grams. |
| Hydroquinone | 12.0 grams. |
| Sodium carbonate ($1H_2O$) | 80.0 grams. |
| Potassium bromide | 2.0 grams. |
| Water to make 2 liters working solution. | |

The apparatus used in practicing the method of the invention is:

(1) An enlarger equipped with adjustable lens stops and timer.
(2) A large glass plate to be used as an easel to prevent chemical contamination on the baseboard.
(3) A supply of PhotoGrade Blotters.
(4) A roller squeegee.
(5) A developer as shown above.
(6) Short stop, fixer, trays, etc. as normally used in darkroom practice.
(7) Photographic paper (graded or variable contrast). It is suggested that normal grade be used to start.

The invention is carried out in the following manner. Prepare the apparatus for normal darkroom operation using the glass plate in place of the conventional enlarging easel. Since the print will be wet when exposing, no special care will be needed to make it lay flat on the easel.

To make a no dodge test print soak an unexposed sheet of paper for approximately one minute in the diluted developer, lay it between blotters and roll with the squeegee ONCE. Place it on the easel at one and adjust the lens diaphragm to produce a suitable exposure for the highlights in approximately four seconds. Expose and allow the print to remain on the easel for a total time of one minute calculated from the start of the exposure. In this case it would remain for 56 seconds after exposure. This waiting time of one minute should be held approximately constant for all experiments. Next place the print in the same developer used for soaking and develop one minute. Short stop, fix and wash as usual. A loss in paper speed of about ½ stop occurs when using wetted paper. If your highlight areas in this no dodge print are too light open the lens and vice versa. After you have determined the exposure for the test print we are ready to set up for maximum dodging. We now must stop down the enlarging lens to increase our standard exposure to about 60 seconds (keeping the total light flux constant). If your test exposure was 4 seconds at *f*5.6, stop down four stops from *f*5.6 to *f*22 and the dodging exposure will be made at *f*22 for 64 seconds. Soak the next sheet of unexposed paper, blot, and expose-develop on the easel for 64 seconds, redevelop in the tray for one minute, short stop, fix and wash as usual. You will observe that after about five seconds of exposure on the easel a positive image appears. This is the dodging mask and protects the shadow portions of the print while the highlights are building up. If this print is too flat for your needs, reduce the exposure time to 32 seconds open the lens to $f16$ and remake. It is impossible to describe all of the possible variations, but the trained darkroom worker can modify the conditions to suit his needs. It is important only to remember that no dodge prints must be exposed less than 5 seconds. Dodged prints require exposures from 5 to 60 seconds (with lens adjustments to keep the total light intensity×time constant). Exposure times longer than 60 seconds are not recommended because the paper will start to dry out and cause problems. Below 5 seconds exposure time, no dodging will occur.

Any graded or variable contrast photographic paper may be used and contrast control as well as dodging can be incorporated in the method. Hand manipulation (or masks) can be used to extend the effectiveness of the dodging principle. If for some reason the exposure range of 4 to 60 seconds cannot be used, neutral density filters used in the negative carrier or voltage regulators in the lamp circuit may be used to change the intensity.

In principle, the dodging effect is obtained by projection printing a negative onto a sheet of photographic paper, previously wetted with developer. As the paper is exposed and developed simultaneously, metallic silver, formed in the exposed areas leaves a masking effect on the subsequently continuing exposure. Thus as the picture continues to develop, the impinging light flux is modulated by a continuously increasing positive mask.

It is apparent that if all the light required for exposure of the print is incident on the print (through the negative) during a brief interval, no mask develops in time to modulate the exposure, and a no dodge print results. On the other hand, when a suitable low light level exposure is given and the time of exposure increased until the sheet has been exposed to the total required light, maximum dodging of the print occurs. Mechanization of this step can be accomplished with any suitable device that can control lamp intensity, (I), and exposure time (T), such that I times T is constant.

After the print has received the total dodging exposure, redevelopment for 90 seconds in the above set forth developing formula is required to achieve maximum densities. This is because the amount of reactive materials absorbed by the paper is not sufficient to fully develop the image. It would appear possible however, to formulate a developer containing sufficient reactive material to imbibe the paper with sufficient developer to complete development without a second development step.

The foregoing description is to be considered merely as illustrative of the invention and not in limitation thereof.

What is claimed is:

1. A photographic dodging method for accurately reproducing all of the desired information contained in an original negative onto a sheet of unexposed photographic paper, said method including the steps of:

(A) soaking the sheet of photographic paper for 60 seconds in a developing formula having the following ingredients and their respective amounts:

| Ingredient: | Amount |
|---|---|
| Water | 750 cc. |
| Sodium sulfite (dessicated) | 90.0 grams. |
| Hydroquinone | 12.0 grams. |
| Sodium carbonate ($1H_2O$) | 80.0 grams. |
| Potassium bromide | 2.0 grams. |
| Water to make 2 liters working solution. | |

(B) blotting the soaked and unexposed sheet of photographic paper, (C) exposing a negative onto the sheet of photographic paper for a varying period of time such that a total exposure-development time of up to 60 seconds is maintained, said period of exposure-development being less than 5 seconds of the total time when no dodging occurs, and said period of exposure-development time being increased from 5 to 60 seconds to increase the degree of dodging from a minimum to a maximum, (D) subjecting the exposed-developed sheet to a final development of up to 90 seconds in the above set forth developing formula, and then (E) short stopping, fixing, and washing the sheet in conventional manner.

2. A method according to claim 1 wherein the degree of dodging in a print is controlled as desired by adjusting the intensity and the time of exposure such that their product is constant.

3. A method according to claim 1 wherein variable contrast protographic paper is used.

4. A method according to claim 1 wherein hand masking is used to extend the effectiveness of the dodging.

References Cited

Chemical Abstracts, 3660, October-December 1911.

GEORGE F. LESMES, Primary Examiner

B. BETTIS, Assistant Examiner

U.S. Cl. X.R.

96—27